US012438890B2

(12) United States Patent
Arafin et al.

(10) Patent No.: US 12,438,890 B2
(45) Date of Patent: Oct. 7, 2025

(54) ATTACK DETECTION AND COUNTERMEASURES FOR AUTONOMOUS NAVIGATION

(71) Applicant: Morgan State University, Baltimore, MD (US)

(72) Inventors: Md Tanvir Arafin, Baltimore, MD (US); Kevin Kornegay, Towson, MD (US)

(73) Assignee: MORGAN STATE UNIVERSITY, Baltimore, MD (US)

( * ) Notice: Subject to any disclaimer, the term of this patent is extended or adjusted under 35 U.S.C. 154(b) by 163 days.

(21) Appl. No.: 18/223,302

(22) Filed: Jul. 18, 2023

(65) Prior Publication Data

US 2024/0214394 A1 Jun. 27, 2024

Related U.S. Application Data

(60) Provisional application No. 63/343,184, filed on May 18, 2022.

(51) Int. Cl.

| | |
|---|---|
| ***H04L 9/40*** | (2022.01) |
| *G01S 19/00* | (2010.01) |
| *G01S 19/21* | (2010.01) |
| *G01S 19/25* | (2010.01) |

(52) U.S. Cl.

CPC ................ *H04L 63/14* (2013.01); *H04L 9/40* (2022.05); *G01S 19/00* (2013.01); *G01S 19/21* (2013.01); *G01S 19/215* (2013.01); *G01S 19/25* (2013.01); *G01S 19/256* (2013.01)

(58) Field of Classification Search

CPC ........ G01S 19/00; G01S 19/21; G01S 19/215; G01S 19/25; G01S 19/256; H04L 9/40; H04L 63/14

See application file for complete search history.

(56) References Cited

U.S. PATENT DOCUMENTS

| | | | | |
|---|---|---|---|---|
| 11,415,438 | B2 * | 8/2022 | Khoury | G01D 3/08 |
| 11,644,834 | B2 * | 5/2023 | Ditty | G06F 15/7807 701/23 |
| 2019/0258251 | A1 * | 8/2019 | Ditty | G05D 1/0274 |
| 2022/0272122 | A1 * | 8/2022 | Kaabouch | H04W 12/122 |

OTHER PUBLICATIONS

"Pose Estimation for an Autonomous Vehicle using Monocular Vision"—2017 Indian Control Conference (ICC), Indian Institute of Technology, Jan. 6, 2017 https://ieeexplore.ieee.org/stamp/stamp.jsp?tp=&arnumber=7846512&tag=1 (Year: 2017).*

"Drift with Devil: Security of Multi-Sensor Fusion based Localization in High-Level Autonomous Driving Under GPS Spoofing"—Shen et al., Proceedings of the 29th USENIX Conference on Security Symposium, ACM Digital Library, Aug. 12, 2020 https://dl.acm.org/doi/10.5555/3489212.3489265 (Year: 2020).*

* cited by examiner

*Primary Examiner* — Randy A Scott

(74) *Attorney, Agent, or Firm* — Whiteford, Taylor & Preston, LLP; Peter J. Davis

(57) ABSTRACT

Autonomous navigation cyber-attack detection and/or avoidance techniques include visual and inertial odometry (VIO) algorithms to provide a root-of-trust during navigation, VIO algorithms that cross-validate navigation parameters using IMU and visual data, and hardware-dependent attack survival mechanisms that support autonomous systems during an attack.

2 Claims, 5 Drawing Sheets

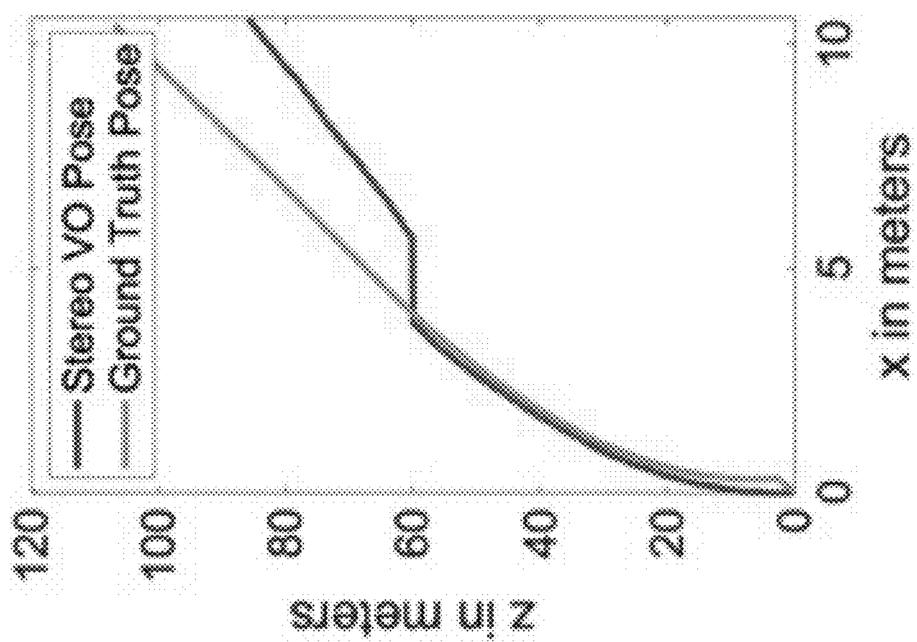
FIGURE 1C
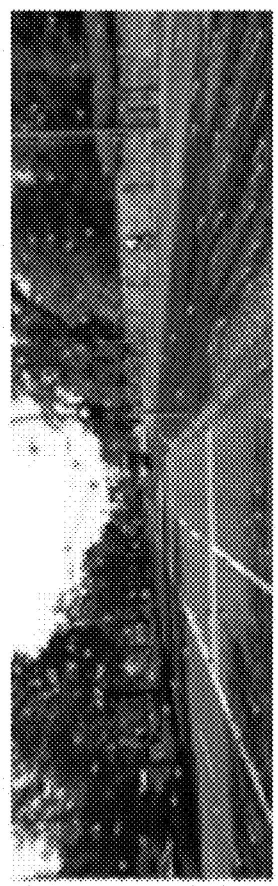
FIGURE 1A
FIGURE 1B

ATTACK DETECTION AND COUNTERMEASURES FOR AUTONOMOUS NAVIGATION

FIELD OF THE INVENTION

This invention relates to autonomous driving systems.

SUMMARY OF THE INVENTION

The present invention addresses the problem in which a cyber-attack targets/corrupts sensor data (for example, from a GPS/IMU sensor and camera) of an autonomous vehicle navigation system, thereby influencing the control algorithm and/or making real-time map, localization, or navigation data unavailable to the autonomous entity. Two solutions are presented: Replay-Attack Detection Using Pose Validation and GPS Spoofing Detection Using Visual Odometry, both optionally augmented with root-of-trust hardware.

It is specifically noted that every combination and sub-combination of the above-listed and below-described features and embodiments is considered to be part of the invention.

BRIEF DESCRIPTION OF DRAWINGS

The foregoing summary, as well as the following detailed description of the preferred invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIGS. 1A-1C show an example of replay attack on stereo visual odometry. FIG. 1A shows flow matching for stereo-visual odometry on the KITTI data-set. A. Geiger, P. Lenz, C. Stiller, and R. Urtasun, "Vision meets robotics: The KITTI dataset," *International Journal of Robotics Research* (*IJRR*), 2013. FIG. 1B shows feature selection. FIG. 1C shows a replay attack on the camera inputs that affects the stereo visual odometry (VO).

DETAILED DESCRIPTION OF THE INVENTION

A. Replay-Attack Detection Using Pose Validation

In replay attacks, visual sensors are compromised, and the attacker inserts previous frames or holds an image frame during the attack. As a result, visual odometry-based algorithms fail. For example, the effect of a replay attack on a stereo camera data is demonstrated in FIGS. 1A-1C which present an example of a replay attack on stereo visual odometry. Stereo-visual experiments are performed using SOFT algorithm and code to enable training of neural networks presented in I. Cvisˇ ió and I. Petrovió, "Stereo odometry based on careful feature selection and tracking," in 2015 *European Conference on Mobile Robots* (*ECMR*), 2015, pp. 1-6; and Stereo-odometry-soft. [Online]. Available: FIGS. 1A and 1B show flow matching (FIG. 1A) and feature selection (FIG. 1B) for stereo-visual odometry on the KITTI vision dataset that provides recordings from two high-resolution color and gray-scale video cameras along with the ground truth provided by a laser scanner and a GPS/IMU localization system. A. Geiger, P. Lenz, C. Stiller, and R. Urtasun, "Vision meets robotics: The KITTI dataset," *International Journal of Robotics Research* (*IJRR*), 2013. FIGS. 1A and 1B have spoofed data on both of the stereo sensors for 20 frames. FIG. 1C shows the large deviation of the stereo odometry pose (red line) from the ground truth (green line) resulting from the replay attack on the camera inputs that affects both stereo sensors for 20 frames.

Visual and inertial odometry (VIO) algorithms can provide navigation support during an attack. Standard visual odometry can give a measure of pose and localization during navigation. Hence, an attack on the camera image will create erroneous pose estimates. According to a first embodiment of the invention, secondary pose measurement from the inertial measurement units ("IMUs") is used to cross-validate the results generated from the visual odometry ("VO") algorithms. According to a preferred embodiment, the SOFT-VO algorithm and tool may be used for measuring pose. Since any attack on the sensor image will corrupt the pose measurement, attacks can be detected by estimating a corresponding pose from the IMUs at every frame.

However, IMU measurements are not an absolute representation of the ground truth, and as time progresses, these measurements exhibit a non-linear drift away from the correct value. Therefore, using an IMU-derived pose alone for comparison and anomaly detection may result in high false-positive rates. Therefore, the present invention includes a fast and configurable detection technique to model the relative nonlinear drift between the IMU and VO measurements. Specifically, according to a preferred embodiment of the invention, a shallow neural network-based non-linear autoregressive exogenous model (NARX) is used to model the nonlinear drift between the IMU pose and the VO-derived pose estimation. NARX can model a target y at time t that depends on previous values of y and another input x.

Figure 2:
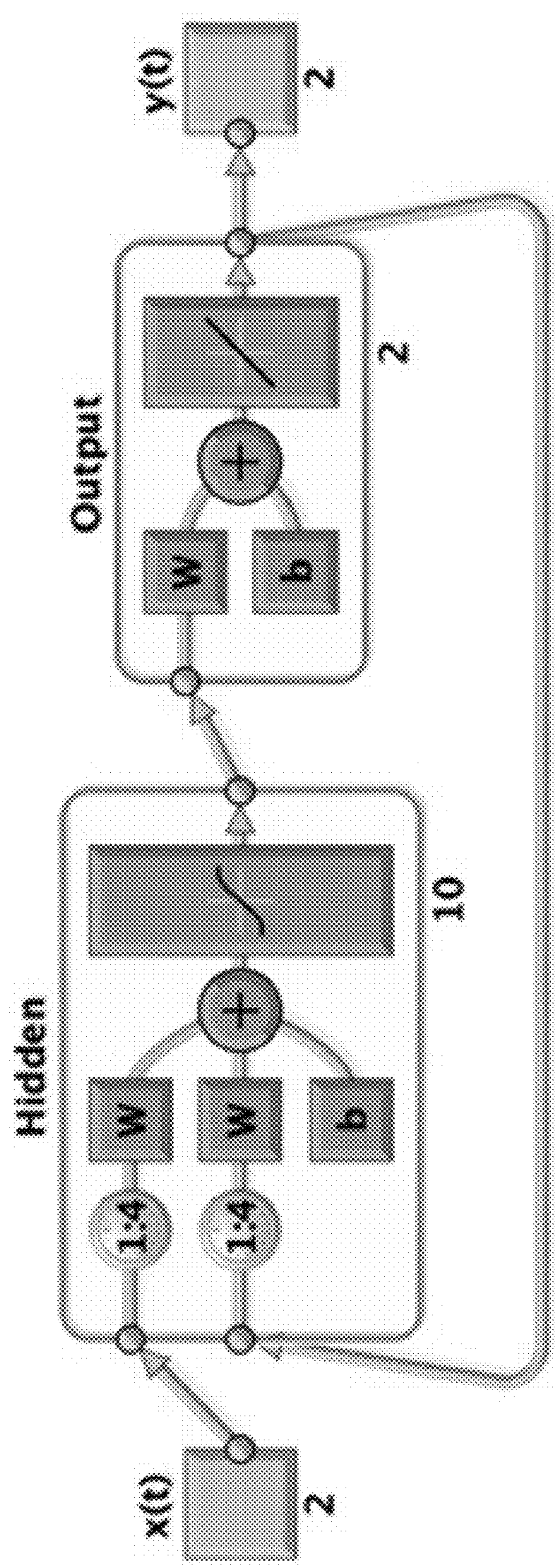
FIG. 2: Attack detection using a shallow closed-loop neural network. The inertial measurement unit (IMU) pose is represented by the variable x, and the VO-estimated pose is represented by y. Any attack that corrupts the y(t) will force the error of a trained model to jump as shown in FIGS. 3A and 3B.

Shallow neural network-based NARX models are fast, computationally efficient, and useful in modeling nonlinear drifts. Accordingly, an open-loop NARX model is used for training the drift estimation between pose measurements from different sensor inputs. A closed-loop model (see FIG. 2) is used for multi-step prediction of the pose drift y(t) based on Equation (1):

$$y(t)=F(y_{t-1},y_{t-2}, \ldots ,x_t,x_{t-1},x_{t-2}, \ldots )+\in \quad (1)$$

Figure 3B:
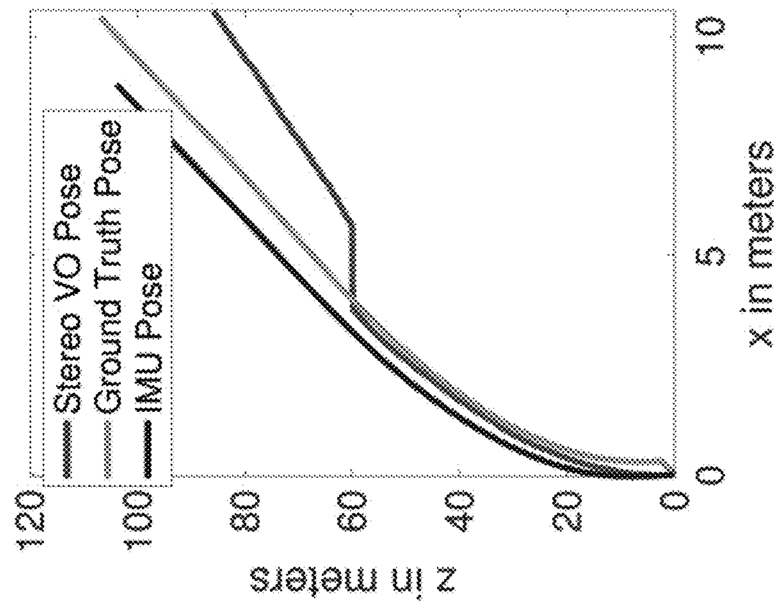
FIG. 3B shows the difference in distance x between predicted and measured pose over traveled distance z.
Figure 3A:
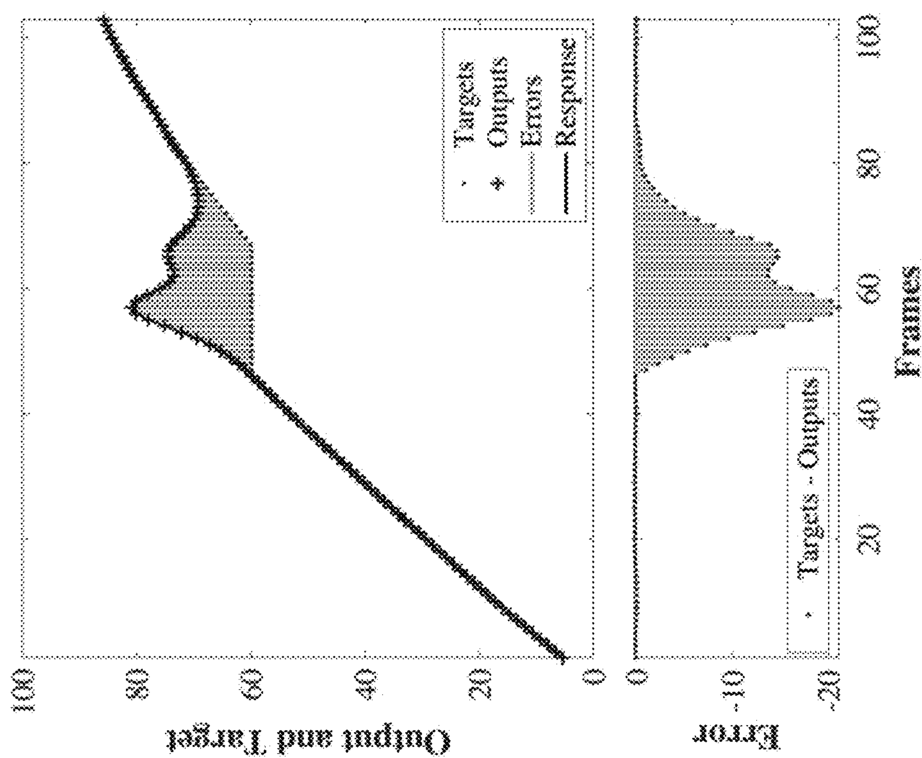
FIG. 3A shows an example of replay attack detection in which the closed loop network predicts the VO pose using the IMU data and updates itself based on the VO pose. The VO measurements have the frequency of 10 Hz. Thus, the x-axis represents a window of 10 seconds.

Attack detection can be performed based on specifying a threshold on the modeling error, as shown in FIGS. 3A and 3B. In this way, small temporal windows (such as the 10 s window in FIG. 4A) can be used to detect replay attacks on the image sensors. An anomalous event is considered to have been detected when the error E(t) crosses a predefined threshold. This windowed approach can provide attack detection within (10 s) from the launch of the attack.

B. GPS Spoofing Detection Using Visual Odometry

For a GPS spoofing attack, an attacker can spoof the GPS data using weak or strong attack techniques. Q. Luo, Y. Cao, J. Liu, and A. Benslimane, "Localization and navigation in autonomous driving: Threats and countermeasures," *IEEE Wireless Communications*, vol. 26, no. 4, pp. 38-45, 2019. G. Oligeri, S. Sciancalepore, O. A. Ibrahim, and R. Di Pietro, "Drive me not: GPS spoofing detection via cellular network: (architectures, models, and experiments)," in *Proceedings of the* 12*th Conference on Security and Privacy in Wireless and Mobile Networks,* 2019, pp. 12-22. For example, during replay based weak spoofing attack, an attacker first records the authentic GPS data and then, using a stronger signal generator, replays the GPS data near the sensor. As a result, the GPS sensor can be induced to follow the replayed data. On the other hand, during a strong attack, an attacker creates a spoofed GPS data set and slowly induces the victim to follow the fabricated data. Strong GPS attacks start with a small perturbation in the receiver data so that the attack is difficult to detect using anomaly detection techniques. As time progresses, the attacker further deviates the data from the ground truth and captures the receiver.

Figure 4A:
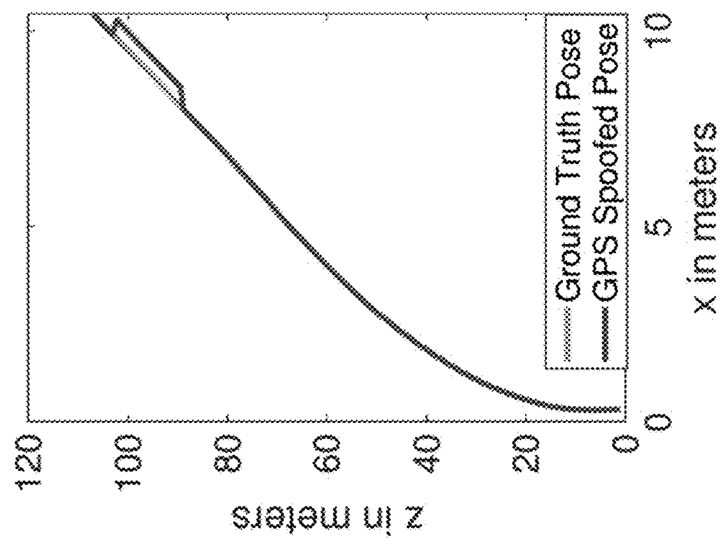
FIG. 4A is a graph showing GPS spoofing data attack (red line) that introduces sudden jumps in both x-axis and z-axis pose as derived from the OxTS measurement. An LSTM based drift forecasting is used for determining attack scenarios. It is assumed that the LSTM is trained on the first 50 frames and predicts the difference between GPS and VO-derived pose for the remaining 50 frames.

In this embodiment, there is presented a long short-term memory (LSTM)-based detection technique that offers real-time attack detection. In this embodiment, data from the inertial measurement unit and GPS is cross-validated using a secure LIDAR or camera measurement, under the assumption that attackers do not have access to the image/LIDAR sensor and therefore cannot corrupt the VO or LIDAR-based pose estimation. For example, a GPS spoofing attack is depicted in FIG. 4A, where a spoofed GPS signal is introduced for 20 frames. To detect such attacks, LSTM-based prediction and anomaly detection methods are used. The LSTM design parameters are given in Table I.

TABLE I

LSTM DESIGN PARAMETERS USED IN THIS WORK.

| Design Parameter | Value |
|---|---|
| Layers | Sequence Input Layer with 1 feature<br>LSTM Layer with 200 hidden units<br>Fully Connected Layer with 1 response<br>Regression Layer |
| Training Algorithm | ADAM |
| Max. Epochs | 100 |
| Gradient Threshold | 1 |
| Initial Learning Rate | 0.005 |
| Learning Rate Schedule | piecewise |
| Learning Rate Drop Period | 125 |
| Learning Rate Drop Factor | 0.2 |

According to this embodiment of the invention, LSTMs are employed to predict the measurement differences between the GPS position and VO-derived positions in x- and z-coordinates. The LSTMs use data from the first half of a 10 s window for training and make predictions on the last half of the window. Discontinuous, sudden, or abrupt changes in the GPS measurement will create an anomalous shift from the predicted and forecast positions, as shown in FIGS. 4A-E which show the results of a spoofed GPS signal for 20 frames, compromising the integrity of the positional data and corrupting the IMU's computation.

Figure 4B:
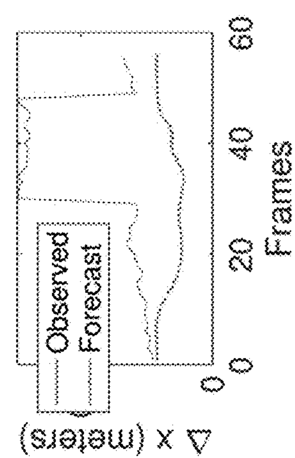
FIG. 4B shows the difference between forecast pose and observed x axis pose for the data of FIG. 4A.
Figure 4C:
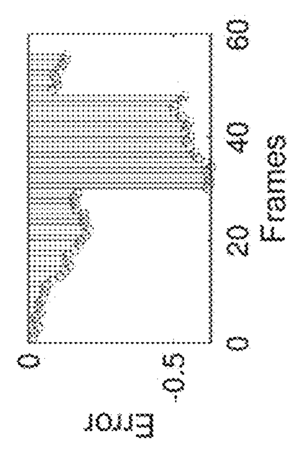
FIG. 4C charts the differences shown in FIG. 4B as error.
Figure 4D:
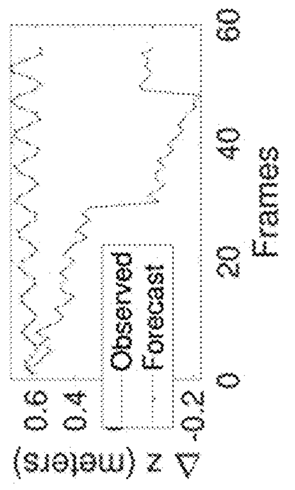
FIG. 4D shows the difference between forecast pose and observed z-axis pose for the data of FIG. 4A.
Figure 4E:
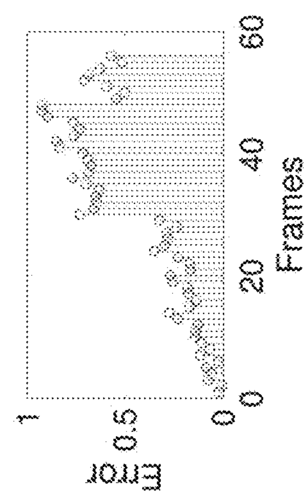
FIG. 4E charts the differences in FIG. 4D as error.

FIG. 4A presents the GPS data attack that introduces sudden jumps in both x-axis and z-axis pose as derived from the OxTS measurement. An LSTM-based drift forecasting is used for determining attack scenarios, where the LSTM is trained on the first 50 frames and predicts the difference between GPS and VO-derived pose for the remaining 50 frames. FIGS. 4B and 4C show the difference (FIG. 4B) and error (FIG. 4C) between forecast and observed x-axis pose. Figured 4D and 4E show the difference (FIG. 4D) and error (FIG. 4E) between forecast and observed z-axis pose.

C. Hardware Root-of-Trust in Spoofing Detection

The learning-based embodiments for cross-validation described herein require a trusted sensor reading. That is, if/when an attacker corrupts external sensor inputs, an internal root-of-trust is required for detecting the attack and bearing through it or gracefully terminating driving. Therefore, according to various embodiments of the invention, on-board trusted hardware is employed to provide another layer of protection against corrupted sensor data.

Trusted hardware mounted internally in the autonomous system can monitor the sensors' intrinsic properties and detect data corruption. For example, GPS time signals may be cross-validated with a free-running hardware oscillator. A free-running oscillator will accumulate drift when compared with another clock. Since GPS data contains time signals for precise synchronization, GPS time signals can measure the intrinsic frequency drift of a local free-running oscillator. This frequency drift can be efficiently modeled using a Kalman filter. Any attack on the IMU/GPS sensor will create large deviations in measuring the local clock's frequency drift. Thus, by measuring the frequency states of a hardware clock using the received GPS signal as a reference, attacks on the received GPS data can be detected.

Figure 5B:
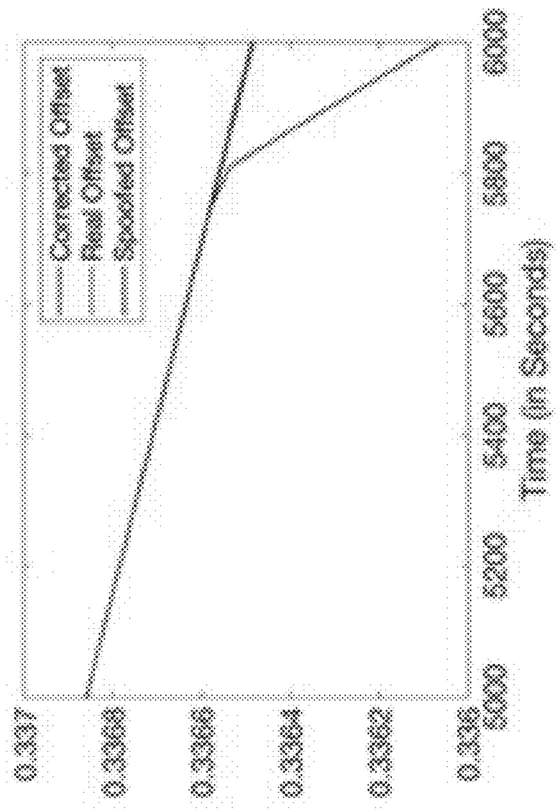
FIG. 5B shows attack survival using on-board hardware oscillators in which a GPS spoofing attack on the autonomous system is simulated where the attacker corrupts the GPS timing data by taking control of the GPS signal and slowly moving the perceived truth.
Figure 5A:
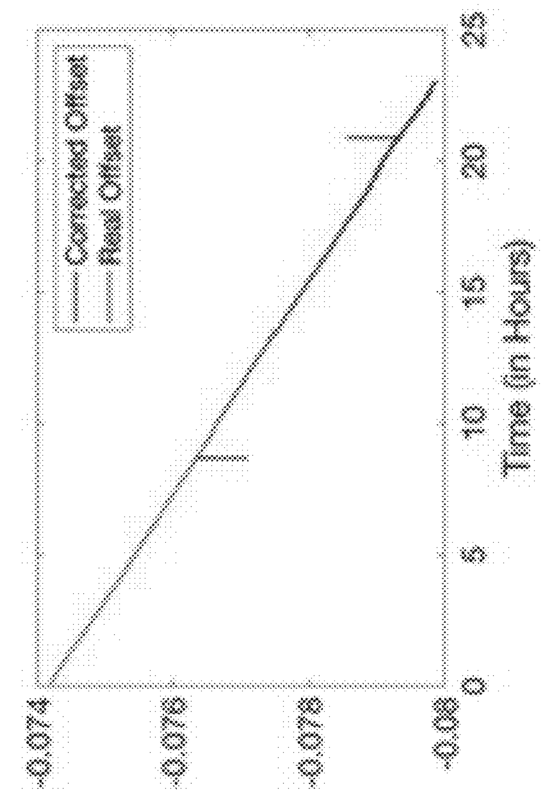
FIG. 5A shows attack survival using on-board hardware oscillators in which a GPS spoofing attack on the autonomous system is simulated where the attacker corrupts the GPS timing data by replaying the same data with a delay added.

During an attack on an autonomous vehicle, it is imperative to survive the attack either by relying on secondary driving tactics or by graceful termination of the autonomous driving. Therefore, the LSTM-based forecasting techniques can be critical for surviving attacks. Moreover, an attack on the GPS/IMU can be survived using the approximate on-board measurement of relevant data, as shown in FIGS. 5A and 5B. The attacks shown in both FIGS. 5A and 5B are detected using an on-board free-running oscillator. M. T. Arafin, "Hardware-based authentication for the internet of things." M. T. Arafin, D. Anand, and G. Qu, "A low-cost GPS spoofing detector design for internet of things (IoT)

applications," in *Proceedings of the on Great Lakes Symposium on VLSI* 2017. ACM, 2017, pp. 161-166.

It will be appreciated by those skilled in the art that changes could be made to the preferred embodiments described above without departing from the inventive concept thereof. It is understood, therefore, that this invention is not limited to the particular embodiments disclosed, but it is intended to cover modifications within the spirit and scope of the present invention as outlined in the present disclosure. It is specifically noted that every combination and subcombination of the above-listed and below-described features and embodiments is considered to be part of the invention.

The invention claimed is:

1. A method for detecting a replay attack on an autonomous navigation system and surviving said replay attack, comprising:

using two or more stereo image sensors mounted in an autonomous vehicle to collect primary pose data for said autonomous vehicle, using inertial measurement units mounted in said autonomous vehicle to collect secondary pose date for said autonomous vehicle, sending said primary data and said secondary data to a neural network, using an open-loop shallow neural network-based nonlinear autoregressive exogenous model on said neural network to train drift estimation between said primary pose data and said secondary pose data; and using a closed-loop model on said neural network for multi-step prediction of pose drift y(t) between said primary pose data and said secondary pose data based on the equation:

$$y(t) = F(y_{t-1}, y_{t-2}, \ldots, x_t, x_{t-1}, x_{t-2}, \ldots) + \epsilon; \quad (1)$$

wherein said neural network comprises a predefined threshold modeling error and a predefined temporal window for assessing anomalous events;

said method further comprising implementing attack survival steps when error E(t) exceeds said predefined threshold modeling error, said attack survival steps including termination of autonomous driving.

2. The method of claim 1, further comprising monitoring trusted hardware mounted internally in said autonomous navigation system to detect data corruption by cross-validating GPS time signals with a free-running oscillator.

* * * * *